(No Model.) 2 Sheets—Sheet 2.
J. C. MARTIN.
CONVEYING APPARATUS.
No. 536,731. Patented Apr. 2, 1895.
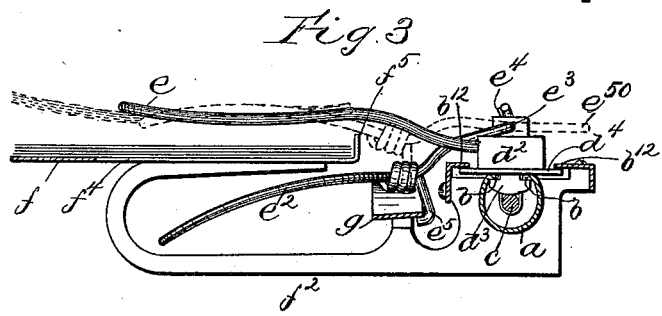
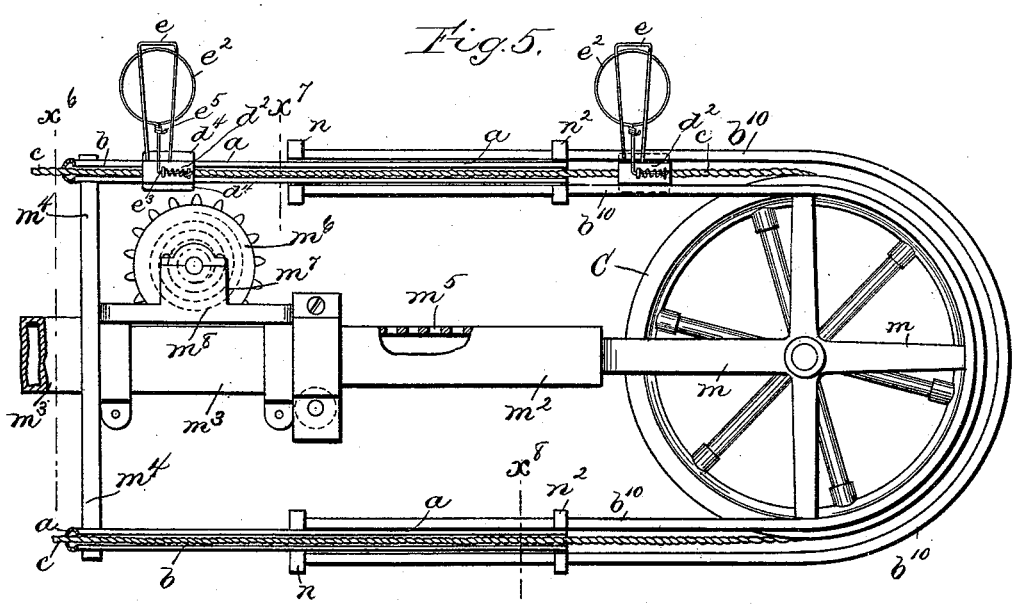
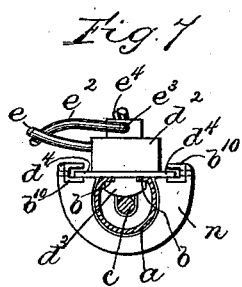 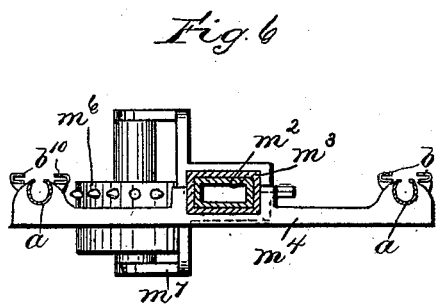 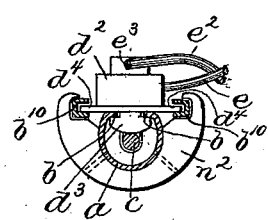
Witnesses
Jas. J. Maloney
M. E. Hill
Inventor.
Joseph C. Martin
by Jos. P. Livermore
Att'y

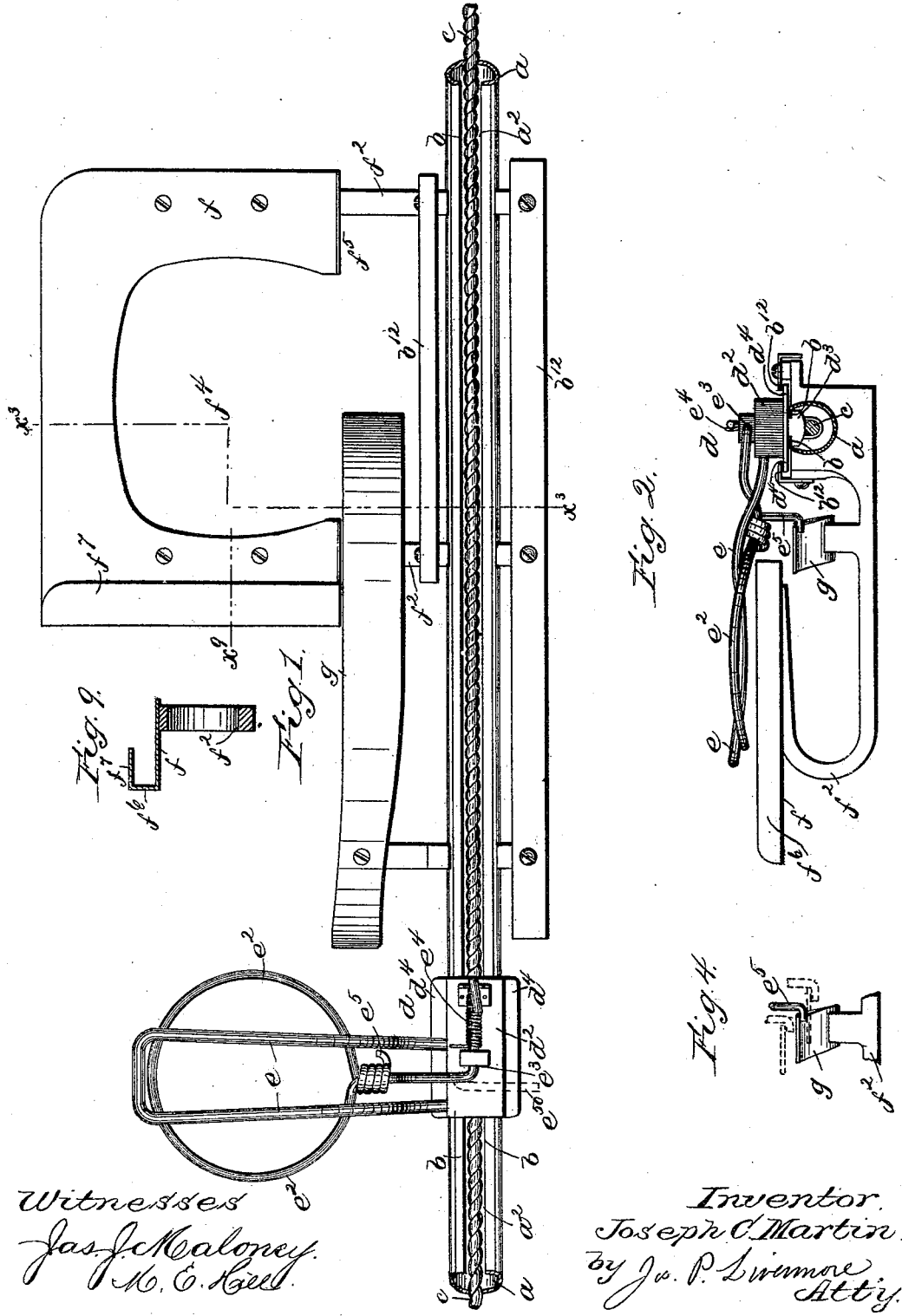

UNITED STATES PATENT OFFICE.

JOSEPH C. MARTIN, OF NORTHAMPTON, MASSACHUSETTS.

CONVEYING APPARATUS.

SPECIFICATION forming part of Letters Patent No. 536,731, dated April 2, 1895.

Application filed October 23, 1893. Serial No. 488,907. (No model.)

*To all whom it may concern:*

Be it known that I, JOSEPH C. MARTIN, of Northampton, county of Hampshire, State of Massachusetts, have invented an Improvement in Conveying Apparatus, of which the following description, in connection with the accompanying drawings, is a specification, like letters on the drawings representing like parts.

My invention relates to a conveying apparatus which is especially adapted for carrying sheets of paper from one point to another, although it may also be used for carrying other objects or material.

The invention is embodied in an apparatus comprising a track along which one or more conveying devices are propelled by a continuously running cord or cable said conveying devices being adapted to automatically seize and let go of the object to be carried at definite points in their movement.

The apparatus also comprises one or more supports for the object to be carried, arranged in suitable position with relation to the track; upon which supports the said objects are laid by the operator and from which they are automatically taken by the carrier at its next passage past the said supports.

The carrier is provided with a clamp composed of a pair of jaws or clamp members adapted to seize the object between them, and so arranged that with the said object clamped between them they will pass the supports for the objects to be carried without interference; and means are provided for opening the clamp or separating the jaws as they approach the support from which the object is to be taken, in such manner that one jaw will pass at one side and the other at the opposite side of the object sustained on the said support and during their passage will close upon said object and thus seize and remove it from its support and carry it to the point at which the object is to be delivered, where the clamp will be again opened and the object permitted to escape therefrom.

The apparatus is adapted to be used in any place where papers or similar objects are to be carried from point to point in the transaction of business, and for convenience will be described as applied to the specific use of conveying telegraph messages from one point to another in a distributing station where messages are received from various points and again transmitted to various other points. At such stations, the messages that are received by the various different operators are commonly sent to a central distributing point and are there assorted and distributed each to the proper transmitting operator to forward the same to its destination.

The conveying apparatus forming the subject of this invention is adapted to take the telegraphic messages in the form in which they are ordinarily written, from operators located at various different points or stations, and to convey the messages thus taken to a central point; and then, if need be, to take messages from the central point of distribution and deliver them to their various different stations throughout the office.

The support for the blank or blanks to be conveyed, consists essentially of a flat plate or table having a large opening or recess over which the blank lies. This table is so arranged that the two jaws of a conveyer, if closed together or upon the article held between them, may pass wholly above the same without disturbing the blanks that may be resting thereon, but a conveyer that is intended to take blanks from this particular support may be so operated that one jaw will pass above the table and blanks thereon, while the other jaw will pass below the table and blanks lying thereon until it arrives at the recess in said table at which point it will be quickly closed toward its co-operating member thus passing through the recess in the table, engaging the under side of the blanks resting thereon and lifting the same until arrested by the jaw which is passing above the table, when the said blanks will be securely held between the said jaws and carried on until the point of delivery is reached, when the jaws will be again separated and the blank or blanks delivered therefrom. Usually there will be a number of such supports or stations and a carrier corresponding to each, any given carrier having its jaws operated only at the corresponding station, so that each carrier will take the blanks from the support at the corresponding station and will carry the same past all other stations except the delivery station without being affected.

Figure 1 is a plan view of a portion of a conveying apparatus embodying this invention, showing one of the supports and the conveying device approaching the same. Fig. 2 is an end elevation thereof as seen looking from left to right, Fig. 1; Fig. 3, a transverse section through the support at the point indicated by line $x^3$, Fig. 1, illustrating the operation of the conveyer in taking the blanks from their support; Fig. 4, (Sheet 1,) a detail illustrating the arrangement by which some and not others of the conveyers are operated at any given station; Fig. 5, a plan view illustrating the construction at the end of the track by which the actuating cable is maintained in the proper state of tension; Figs. 6, 7, and 8, sectional details on lines $x^6, x^7, x^8$, Fig. 5; Fig. 9, (Sheet 1,) a sectional detail on line $x^9$, Fig. 1.

The track or way upon which the carriers move may be of any suitable or usual construction and is herein shown as substantially like the track employed in the conveying apparatus represented in the Patent No. 475,879, granted to me May 31, 1892, consisting essentially of a tube $a$ having a longitudinal slot $a^2$ the edges of which constitute longitudinal flanges or guide-rails $b$ on which the carriers run, the remainder of the tube being merely a frame work to support the said guides $b$ in proper position with relation to one another, and also inclosing and supporting the propelling cord $c$ by which the carriers are moved along the said way.

The carriers $d$ are each composed of a carriage or slide block $d^2$ the greater portion of which lies outside of the track tube $a$ but is connected with a portion $d^3$ that is contained within the said tube and is connected with the outside portion $d^2$ by a neck which enters the slot $a^2$ of the track tube, there being thus formed between the outside and inside parts $d^2, d^3$, at each side of said neck, grooves which receive the track flanges $b$ which thus guide the said slide block in its longitudinal movement along the said track.

The internal portion $d^3$ of the carrier is permanently fastened to the propelling cord $c$ which extends the entire length of the track, passing around guide pulley at angles thereof and around a driving pulley located at any convenient point which imparts a constant motion to the said cord and carriers connected therewith while the apparatus is in operation.

The cord and track are endless, or in other words, form an inclosed loop or circuit around which the carriers travel continuously, and means are provided for taking up slack in the cord or maintaining it in a state of proper tension as will be hereinafter described.

The carrier block $d^2$ is provided with flanges $d^4$ that are preferably located above and outside of the grooves that receive the track flanges $b$ for a purpose that will be hereinafter described. The carrier blocks $d^2$ are by means of the propelling cord $c$ with which they are permanently connected, caused to travel continuously along the track, and they pass every station thereon at each course around the track. The carriers also comprise a clamp jaw $e$ shown as a loop of stout wire rigidly connected to the block $d^2$ and constituting one member of the clamp, the other member $e^2$ of which is pivotally connected with the said carrier block $d^2$ at $e^3$ and is acted upon by a spring $e^4$ see Fig. 1, tending to move the said clamp member $e^2$ up against the clamp member $e$ as best shown in Fig. 2.

The clamp members may be separated as shown in full lines Fig. 3, by moving the member $e^2$ on its pivot $e^3$ against the force of the spring $e^4$; but when the said member is left under the action of said spring it is pressed against the opposite member $e$ as shown in Figs. 1 and 2, or against any material that may be interposed between the said members as indicated in dotted lines Fig. 3. The said members are shown in this instance as properly constructed to effectively grasp a sheet of paper or pile of such sheets and hold them securely between them. When the clamp jaws are closed together as shown in Fig. 2 or upon the material held between them as shown in Fig. 3 they travel along in a definite path with relation to the track tube $a$ and are unobstructed in their movement by anything which does not intersect said path. At the points or stations where the messages are to be taken by the carriers, a support $f$ is provided, shown in this instance as a shelf sustained in definite position with relation to the track tube $a$ by brackets $f^2$ fixed to said tube, the position of said shelf being such that the clamp jaws together with anything which may be carried between them will pass over said shelf without interference therewith as shown in Figs. 2 and 3. The said shelf is provided with an opening $f^4$ and is provided with lips or ledges $f^5, f^6$, to properly gage the position of the sheets laid upon it, which sheets thus rest upon the shelf and over the opening $f^4$ thereof, just below the path traversed by the clamp members $e, e^2$, when closed upon one another. The clamp member $e^2$ may, however, be turned upon its pivot $e^3$ and separated far enough from the clamp member $e$ to pass below the shelf $f$ while the clamp member $e$ remains above the same as shown in full lines Fig. 3, and the carrier that is to take blanks from the shelf at a given station is so operated that the jaws will be separated upon approaching the station as shown in full lines Fig. 3, so that the spring actuated jaw $e$ will pass below the blank supporting shelf, and at the position about opposite the opening $f^4$ the spring pressed jaw is released and is thrown by its spring $e^4$ toward the jaw $e$ and is thus caused to pass through the opening $f^4$ in the shelf and in so doing it engages with the under side of the sheet or sheets lying upon the said shelf, lifts them up therefrom, and clamps them against the member $e$ so that in the further movement of the carrier the sheets are removed from the shelf and carried along with the carrier.

Means are provided for automatically separating and then releasing the clamp members at points where sheets are to be taken up, or at points where sheets previously taken are to be delivered, this operation being performed as shown in this instance by means of a cam, or guide piece $g$ supported in fixed relation to the track so as to engage with a finger $e^5$ on the spring actuated clamp member and cause the said member to be turned upon its pivot as the carrier progresses along the track as will be readily understood from Figs. 1, 2, and 3.

When there are several carriers and several stations and it is desirable that each carrier should be operated only at a corresponding station, and should pass the other stations, without being operated, the clamp operating cams $g$ and the corresponding fingers $e^5$ may be graduated at the different stations as indicated in Fig. 4, where the cam and corresponding finger for one station are shown in full lines and the relative position of the cams at the preceding and succeeding stations and of the fingers of carriers to be operated thereby are shown in dotted lines. Thus the cams $g$ at the different stations are set at different levels and also at different distances laterally from the track. For example, that at the first station may be highest and farthest out and the finger $e^5$ of the corresponding carrier properly located to engage with the said cam. That at the next station will be at a lower level so that the finger of the carrier for the first station will pass over it, and it will also be nearer the track so that the finger for the second station which extends to a lower level than that for the first will pass by at the side of the cam for the first station, but will be in proper position both as to level and lateral position for the cam at the second station. Thus each finger will pass by the cams at all stations but its own without engaging the same, passing above the level of such cams as correspond to stations beyond its own and passing to one side of the cams corresponding to stations preceding its own, assuming that the cams are arranged in regular order as has been described, that at the first station from a given point being highest and farthest out, while the succeeding ones are consecutively lower and nearer the track.

If it is desired that all the carriers should deliver at one point as at the central station suitable cams may be arranged at that point to open the jaws of all the carriers as they pass, thus causing them to release and drop the blanks carried by them, and subsequently any given carrier may take the blanks from any given support and it will convey the same until it arrives at a cam properly located to engage with the finger of its clamp member, when the clamp members will be separated and the blanks delivered, after which they may be operated at the same or any other point to again engage other blanks properly supported at such point and convey them to a point farther along the line.

When all the carriers are to be operated to separate their clamp members at some single point or general receiving station on the line, but are also to be operated independently one at each one of a number of other stations along the line, the movable clamp member $e^2$, may be provided with a second operating finger as shown in dotted lines at $e^{50}$, Figs. 1 and 3, the said fingers $e^{50}$, of all the carriers that are to be opened at the one general station being located in the same position with relation to the guide portion or slide block $d^2$ of the carrier so that a single cam properly located at the general receiving station will engage with the finger $e^{50}$, of each carrier as it passes and operate the same to separate the jaws and thus cause them to release and deliver the material carried by them.

As before stated the track is an endless one around which the carriers travel continuously and it is necessary to provide for variations in length of the endless propelling cord or belt $c$ so that it may always be maintained in a state of sufficient tension to run properly through the track and around the various pulleys without fouling owing to slackness and without producing too strong pressure on the bearings of the pulleys owing to a shortening or contraction of the cord.

Provision is made for automatically controlling the tension of the cord by providing at some convenient point a loop portion of the track as shown in plan view in Fig. 5 where the cord $c$ passes half around the periphery of a guide pulley C which is so supported as to be capable of movement in a line parallel with the two branches of the cord $c$ extending to the said pulley.

In order to provide for the proper guidance of the carriers in passing around the pulley C if the latter changes its position on the line of the track and cord approaching its periphery, for the purpose of taking up slack in the cord if it stretches or for preventing undue tightening of the cord if it contracts, a portion $b^{10}$, of the track adjacent to the pulley C is connected with the bearing frame $m$ for said pulley and thus accompanies its movements, said portion $b^{10}$, being concentric with the pulley where the cord passes around it, and extending along and so as to overlap a portion of the main track $a$ upon which the portion $b^{10}$, is telescopically movable, to accommodate changes in position of the pulley C that take place for the purpose of maintaining the proper tension on the cord $c$.

In order to provide for proper guidance of the carrier from the main track $a$ to the adjustable track $b^{10}$, as the latter changes its position with relation to the former the said track $b^{10}$, is arranged to co-operate with a different guiding part of the carrier from that engaged by the guide flanges $b$ of the main track $a$, said part being the external flanges $d^4$ of the carrier before mentioned and said adjustable track $b^{10}$, being substantially in the form of two grooved or channeled portions for engaging said flanges $d^4$ as clearly shown in Figs. 7 and 8. Thus along the overlapping portion of the main and adjustable tracks the carriers are engaged both by the flanges $b$ of the main track $a$ and by the channels $b^{10}$, of the adjustable track and upon leaving the end of the main track the carrier is guided wholly by the adjustable track until it passes around the pulley and again enters upon the main track, with which it is fully engaged, before leaving the guidance of the adjustable track. The two tracks are maintained always in line so that the carrier will pass from one to the other, and the adjustable track is guided in its telescopic movement as shown in this instance by a guide $n$ see Figs. 5 and 7, fixed to the end of the auxiliary track and arranged to slide freely on the main track, and by a second guide piece $n^2$ see Figs. 5 and 8, fixed to the end of the main track and constructed to allow the auxiliary track to slide freely in it. The pulley C is yieldingly pressed outward from the end of the main track by a force sufficient to insure the proper tension on the cord $c$ by any suitable means.

As herein shown, the bearing frame $m$ for the pulley C and adjustable track $b^{10}$, is connected with a slide bar $m^2$ working in a tubular guide $m^3$ supported from the main track $a$ by one or more cross bars $m^4$ see Figs. 5 and 6, the said slide bar $m^2$ being provided with rack teeth $m^5$ engaged with a pinion or toothed wheel $m^6$ working in suitable bearings $m^7$ fixed upon the guide tube $m^3$. The said pinion $m^6$ is acted upon by a spring $m^8$ tending to turn the same in the direction to force the rack and pulley C outward and thus operating to take up the slack in the cord $c$ if it should stretch or increase in length for any reason, while on the other hand, if the cord contracts it will draw the pulley C nearer to the ends of the main track against the tension of the spring $m^8$ without causing a sufficient increase in tension of the cord to interfere with its proper running. The flanges $d^4$ of the carriers may also be engaged by ribs or guide pieces $b^{12}$, see Figs. 1, 2, and 3, at the points where the carriers pass the stations and the clamp jaws are operated such additional guide strips operating to resist the torsional strain on the carrier due to the opening of the clamp members, and thus preventing the carriers from binding on the main track guides $b$ when the clamp members are operated.

The mechanical details of construction may be varied widely without departing from the essential features of the invention, and some variations in form may be desirable when the material to be conveyed varies considerably from that herein described.

As herein shown the lower clamp member $e^2$ see Figs. 1 and 2 engages the material (in this case telegraph blanks) at some little distance at each side of the point at which the upper member $e$ engages the upper side thus tending to bend the blanks which are grasped between them slightly so that their ends will curl upward and will thus readily pass over the supports $f$ at the stations where the clamps are not to be operated.

The gaging lip or flange $f^6$ of the supporting shelf $f$ on the end which the carriers approach in their movement along the track, is shown as provided with an overhanging lip $f^7$ see Figs. 1 and 9, to cover the sheets that are lying on the shelf $f$ and prevent them from being disturbed by the passage of a carrier and its contents over the said shelf.

I claim—

1. A conveying apparatus comprising a track or way and propelling cord; combined with a number of carriers permanently connected to said propelling cord and adapted to be moved thereby along the said way, said carriers having clamps to engage with the material to be conveyed; and a number of supports for the material to be conveyed fixed in definite position with relation to said track and located at one side of the path of the clamp when closed, but to hold the material supported thereon between the paths of the clamp members when opened, and clamp opening devices adjacent to said supports but located at different positions with relation to the track at the different supports; and cooperating clamp opening portions arranged in different positions on the different clamps whereby a given clamp is opened when passing a given support but not when passing others, substantially as and for the purpose set forth.

2. The combination of the track or way; and the carrier provided with the clamp adapted to be continuously movable thereon; with a support for the material to be carried fixed in definite position at the side of said way and in determinate relation to the path of movement of said clamp thereon; and means for operating said clamp as the carrier passes said support whereby the clamp is caused to seize the material that may be on said support and convey it therefrom, substantially as described.

3. The combination of the track and carrier movable thereon with a support fixed in definite position with relation to said track, and provided with an opening, said carrier being provided with a clamp both members of which when closed pass at one side of said support; and means whereby one member is caused to pass at one side of said support and the other at the other side and thence through the opening thereof, substantially as and for the purpose set forth.

4. The combination of a track and one or more carriers movable thereon with an endless propelling cord connected with said carriers, a guide pulley and adjustable track portion held in fixed relation to the bearing of said pulley and telescopically adjustable along the main track approaching said pulley, the said carriers having separate guide portions one co-operating with guide portions in the main track, and the other with guide portions of the adjustable track, substantially as and for the purpose described.

5. A conveying apparatus comprising a track or way and propelling cord; combined with a number of carriers permanently connected to said propelling cord and adapted to be moved thereby along the said way, said carriers having clamps to engage with the material to be conveyed; and a number of supports for the material to be conveyed fixed in definite position with relation to said track and located at one side of the path of the clamp when closed, but to hold the material supported thereon between the paths of the clamp-members when opened; and clamp opening devices adjacent to said supports but located at different positions with relation to the track at the different supports; and co-operating clamp opening portions arranged in different positions on the different clamps whereby a given clamp is opened when passing a given support but not when passing others, and another clamp opening portion located in the same position relative to the track on all the clamps; and the clamp opening device co-operating therewith, whereby all the clamps are opened when passing the last mentioned clamp opening device, substantially as and for the purpose described.

6. The combination of the main track or way, and a carrier guided thereon provided with a clamp; with a clamp opening device at the side of the track; and auxiliary guide portions on the track and carrier at the points where the clamp opening devices operate to open the clamp, substantially as described.

7. A conveying apparatus comprising a track or way; an endless propelling cord adapted to be moved continuously along the line of said way; a carrier permanently connected with said cord and having guide portions adapted to be engaged with said way, and having a clamp to seize the material to be conveyed; and a support for the material to be conveyed fixed in definite position with relation to said track; and means for automatically operating said clamp as the carrier passes the said support, substantially as and for the purpose described.

In testimony whereof I have signed my name to this specification in the presence of two subscribing witnesses.

JOSEPH C. MARTIN.

Witnesses:
JOS. P. LIVERMORE,
JAS. J. MALONEY.